United States Patent
Fujisawa et al.

(10) Patent No.: US 7,824,739 B2
(45) Date of Patent: Nov. 2, 2010

(54) METHOD FOR PRODUCING A GOLF BALL

(75) Inventors: Koichi Fujisawa, Kobe (JP); Kazuhiko Isogawa, Kobe (JP); Yoshikazu Yabuki, Kobe (JP)

(73) Assignee: SRI Sports Limited, Kobe (JP)

( * ) Notice: Subject to any disclaimer, the term of this patent is extended or adjusted under 35 U.S.C. 154(b) by 1085 days.

(21) Appl. No.: 11/151,282

(22) Filed: Jun. 14, 2005

(65) Prior Publication Data
US 2005/0282661 A1    Dec. 22, 2005

(30) Foreign Application Priority Data
Jun. 21, 2004    (JP) .............................. 2004-182842

(51) Int. Cl.
B05D 3/02 (2006.01)
A63B 37/00 (2006.01)
A63B 37/02 (2006.01)

(52) U.S. Cl. ........................ 427/384; 427/386; 427/387; 473/355; 473/371; 473/378; 473/365; 473/385; 524/376; 524/504; 524/507; 524/539; 524/591; 525/123; 525/453; 525/528; 528/73; 528/80; 528/81; 528/83

(58) Field of Classification Search ................... 524/555
See application file for complete search history.

(56) References Cited

U.S. PATENT DOCUMENTS 6,217,985 B1 *   4/2001   Hirukawa et al. ........ 428/195.1
6,551,395 B2 *   4/2003   Isogawa ................... 106/31.75
6,994,745 B2 *   2/2006   Hoshida et al. .......... 106/31.85
7,271,213 B2 *   9/2007   Hoshida et al. ............. 524/555

FOREIGN PATENT DOCUMENTS

| JP | 6-262842 A | | 9/1994 |
| JP | 06262842 A | * | 9/1994 |
| JP | 9-328654 A | | 12/1997 |
| JP | 09328654 A | * | 12/1997 |
| JP | 2001-262034 A | | 9/2001 |
| JP | 2001262034 A | * | 9/2001 |

OTHER PUBLICATIONS

Decision on Rejection from corresponding Japanese Application dated Sep. 8, 2009.

* cited by examiner

Primary Examiner—Michael Kornakov
Assistant Examiner—Alexander Weddle
(74) Attorney, Agent, or Firm—Birch, Stewart, Kolasch & Birch, LLP

(57) ABSTRACT

The object of the present invention is to provide A method for producing a golf ball that is excellent In the durability of the mark, the adhesion of the paint Film and the productivity.

In the present invention, since the curing agent contained in the paint covering the mark is used to cure the resin component forming the mark, there is no increase in the viscosity or the gellation of the ink for printing the mark, and thus the mark is printed well during the production of the golf ball.

22 Claims, No Drawings

METHOD FOR PRODUCING A GOLF BALL

BACKGROUND OF THE INVENTION

1. Field of the Invention

The present invention relates to a method for producing a golf ball, more particularly to the method for producing a golf ball, comprising forming a mark on a surface of a golf ball body, and forming a paint film to cover the mark and the golf ball body using an aqueous paint.

2. Description of the Related Art

Marks such as a play number and a brand name representing a commercial name are conventionally printed on golf balls. In general, these marks are printed on the golf ball body, and then protected by the transparent paint film covering the mark and the golf ball body.

In recent years, the shape and color of the marks tend to become diversified, the appearance of the golf ball including marks significantly affects the commercial value of the golf ball. Accordingly, if the mark was peeled off even partially during the use of the golf ball, the commercial value is remarkably lowered and thus the complaints are made by the consumer, although there are no problems with the performance of the golf ball. Under these circumstances, a method for improving the adhesion of the mark and a method for reducing the peel-off of the mark have been proposed.

For example, Japanese unexamined patent publication No.2,001-262,034 relates to a golf ball where the durability of the mark has been improved by the curing reaction. A two-component curing type ink including the polyol as a base resin and the polyisocyanate as a curing agent is used to improve the impact-resistance and the abrasion-resistance.

SUMMARY OF THE INVENTION

As described in Japanese unexamined patent publication No.2,001-262,034, the two-component curing type ink including the polyol as the base resin and the polyisocyanate as the curing agent is typically used as the ink for printing marks. However, the pot life of the two-component curing type ink as described above is not so long that the curing reaction of the two-component curing type ink proceeds while the golf ball is produced, resulting in the increase in the viscosity of the ink or the gellation of the ink. As a result, the unprinted portion occurs in the mark while printing the mark continuously on the golf ball, and the productivity of the golf ball will be lowered because of exchanging the ink. On the other hand, if the amount of the curing agent was reduced to obtain the longer pot life, the durability of the mark will be lowered. Further, a clear paint is conventionally formed on the golf ball body and the mark, but if the adhesion of the clear paint film was poor to the golf ball body, the mark is likely to peel off together when the clear paint peels off.

The present invention has been achieved in view of the above circumstances and the object of the present invention is to provide a method for producing a golf ball that is excellent in the durability of the mark, the adhesion of the paint film, and the productivity.

The present invention provides a method for producing the golf ball, comprising forming a mark on a surface of a golf ball body, forming a paint film to cover the mark and the golf ball body using an aqueous paint, wherein a two-component curing type aqueous paint containing a base resin, a curing agent, and a solvent is used as the aqueous paint forming the paint film, and curing a resin component forming the mark with the curing agent contained in the aqueous paint.

In the present invention, since the curing agent contained in the paint covering the mark is used to cure the resin component forming the mark, there is no increase in the viscosity or the gellation of the ink for printing the mark, and thus the mark is printed well during the production of the golf ball. As a result, the decline of the productivity due to the exchange of the ink will be overcome. Further, since the two-component curing type aqueous paint contains a solvent, the curing agent contained in the paint film can penetrate into the mark sufficiently enough to promote the curing reaction between the resin component forming the mark and the curing agent contained in the paint film. Consequently, the resin component contained in the mark is cured so sufficiently that the durability of the mark is improved.

DESCRIPTION OF THE PREFERRED EMBODIMENT

A method for producing the golf ball of the present invention comprises forming a mark on a surface of a golf ball body, forming a paint film to cover the mark and the golf ball body using an aqueous paint, wherein a two-component curing type aqueous paint containing a base resin, a curing agent, and a solvent is used as the aqueous paint forming the paint film, and (thereby) curing a resin component forming the mark with the curing agent contained in the aqueous paint.

First, the two-component curing type aqueous paint comprising a base resin, a curing agent and a solvent will be explained. The two-component curing type aqueous paint used in the present invention is not limited, as long as the aqueous paint contains an aqueous base resin and an aqueous curing agent and is used by mixing both of them. The cured paint film contains a resin component such as an acrylic resin, an epoxy resin, an urethane resin, a polyester resin, and a cellulose resin. In the present invention, "aqueous" includes "water-soluble" and "water-dispersible".

The functional group may be actively incorporated into the base resin in addition to the functional group that the base resin inherently has in order to enhance the curing reaction with the curing agent. The curing agent may be appropriately selected from the ones that react with both the functional group of the base resin contained in the paint and the resin component (functional group) forming the mark. The combination of the curing reaction between the functional group of the base resin of the paint or the functional group of the resin component forming the mark and the functional group of the curing agent is not limited, and includes, for example, a reaction between isocyanate group with the functional group having an active hydrogen such as hydroxyl group, amino group, imino group, thiol group or carboxyl group; a reaction between epoxy group and amino group, imono group, or carboxyl group; a reaction between aziridine and carboxyl group; a reaction between hydrazide and carbonyl group; and a reaction between carbodiimide and carboxyl acid. Among them, the two-component curing type aqueous urethane paint comprising an aqueous polyol having a hydroxyl group as the base resin and an aqueous polyisocyanate having an isocyanate group as the curing agent is preferred as the aqueous paint forming the paint film. The use of the two-component curing type urethane resin as the resin component of the paint film improves the durability and the adhesion of the resultant paint film.

In the following, the two-component curing type aqueous urethane paint containing the aqueous polyol and the aqueous polyisocyanate, which is preferably used in the present invention, will be explained. The aqueous polyol used for the two-component curing type aqueous urethane paint is not limited, as long as the polyol is aqueous and has at least two hydroxyl groups. Examples of the aqueous polyol are an aqueous polyester polyol, an aqueous polyether polyol, an aqueous urethane polyol, an aqueous acrylic polyol, an aqueous alkyd resin, a polyvinyl alcohol, and a cellulose derivative such as hydroxylethylcellulose and carboxylmethylcellulose. The above aqueous polyol can be used individually or in combination of at least two of them. Among them, it is even more preferable to use the aqueous polyester polyol or the mixture of the aqueous polyester polyol and the aqueous acrylic polyol, because the aqueous polyester polyol improves the impact-resistance of the resulting urethane paint film and the aqueous acrylic polyol improves the weather resistance. More preferably, the aqueous polyol is the mixture of the aqueous polyester polyol and the aqueous acrylic polyol at the mass ratio of the aqueous polyester polyol:the aqueous acrylic polyol=4:1 to 10:1, since the resultant film is excellent in adhesion, durability and weather resistance.

As described above, the aqueous polyester polyol includes a water-soluble polyester polyol and a water dispersible polyester polyol. Examples of the aqueous polyester polyol are a polyester polyol having a carboxyl group and a polyester polyol having a sulfonic acid group. Typically preferred as the aqueous polyester polyol is the aqueous polyester polyol having the carboxyl group, which will be soluble or dispersible into water by neutralizing the carboxyl group with a base.

The aqueous polyester polyol having the carboxyl group can be produced, according to the method well-known for producing the conventional polyester polyol. For example, the aqueous polyester polyol can be obtained by the polycondensation between a (low molecular weight) polyol and a polybasic acid.

The carboxyl group for making the polyester polyol aqueous can be introduced from either the polyol component or the polybasic acid component. A polyol component for introducing the carboxyl group into the polyester polyol includes, for example, dimethylol propionic acid, dimethylol butanoic acid, dihydroxyl propionic acid, or dihydroxyl succinic acid. The polyol component, other than the polyol component for introducing the carboxyl group, includes a well known polyol for preparing the polyester polyol. Examples of the well known polyol are a diol such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, dipropylene glycol, tripropylene glycol, 1,4-cyclohexanediol, and bisphenol A; or a triol such as glycerin and trimethylol propane. The above polyol can be used individually or in combination of at least two of them.

The polybasic acid component for introducing the carboxyl group into the polyester polyol includes, for example, trimellitic anhydride and pyromellitic anhydride. The polybasic acid, other than the polybasic acid for introducing the carboxyl group, includes a well known polybasic acid for preparing the polyester polyol. Examples of the well known polybasic acid are a dibasic acid such as succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephtalic acid, isophtalic acid, 1,4-naphtalenedicarboxylic acid, 2,5-naphtalenedicarboxylic acid, 2,6-naphtalenedicarboxylic acid, naphtalic acid (1,8-naphtalenedicarboxylic acid), and biphenyldicarboxylic acid. The above polybasic acid can be used individually or in combination of at least two of them.

The aqueous polyether polyol includes, for example, a polyethylene glycol.

The aqueous urethane polyol is not limited, as long as it has a urethane bond in the molecular chain thereof and a plurality of hydroxyl groups. The aqueous urethane polyol can be obtained by reacting the above aqueous polyester polyol and/or the aqueous polyether polyol with the polyisocyanate in such a molar ratio that the hydroxyl group of the polyol component is excess to the isocyanate group of the polyisocyanate.

The aqueous acrylic polyol includes, for example, an aqueous acrylic polyol where a (meth) acrylate having a hydroxyl group is copolymerized. Examples of the (meth)acrylate having a hydroxyl group are 2-hydroxyethyl (meth)acrylate, and hydroxypropyl (meth)acrylate. Examples of the other monomer component copolymerized into the acrylic polyol are well-known ethylenically unsaturated monomer such as (meth)acrylic acid, maleic acid, itaconic acid, methyl (meth)acrylate, ethyl (meth)acrylate, isopropyl (meth)acrylate, and n-butyl (meth)acrylate.

The preparation of the aqueous acrylic polyol is not limited, and is conducted by, for example, copolymerizing the ethylenically unsaturated monomer having a carboxyl group such as (meth) acrylic acid, maleic acid, itaconic acid, and neutralizing the carboxyl group with the base, or by emulsion-polymerizing the ethylenically unsaturated monomer containing (meth) acrylate having the hydroxyl group in the presence of the surfactant.

The aqueous polyol preferably has hydroxyl value of not less than 25 mgKOH/g, more preferably not less than 30 mgKOH/g, and preferably has hydroxyl value of less than 100 mgKOH/g, more preferably not more than 95 mgKOH/g. If the aqueous polyol has hydroxyl value of less than 25 mgKOH/g, the adhesion between the paint film and the golf ball body will be lowered. While if the aqueous polyol has hydroxyl value of 100 mgKOH/g or more, the curing reaction with the aqueous polyisocyanate takes longer time, resulting in the lower productivity. The hydroxyl value is determined, for example, by the potentiometric titration, according to JIS-K1557.

The aqueous polyol preferably has a weight average molecular weight of 4,000 or more, more preferably 5,000 or more, even more preferably 6,000 or more, and preferably has a weight average molecular weight of 20,000 or less, more preferably 17,000 or less, even more preferably 15,000 or less. If the weight average molecular weight is less than 4,000, it takes a longer time to dry the paint, resulting in the lower productivity, while if the weight average molecular weight is more than 20,000, the hydroxyl value becomes relatively low, thus the adhesion between the paint film and the golf ball body will be lowered. The molecular weight of the aqueous polyol is determined by Gel permeation chromatography using polystyrene as a standard material.

The preparation of the aqueous polyol liquid is not limited, and is conducted by, for example, neutralizing the carboxyl group with the base in the case of the polyol having a carboxyl group. The base for neutralizing the carboxyl group includes, for example, a primary amine such as ammonia, methylamine, and ethylamine; a secondary amine such as diethanol amine, dimethyl amine, and diethyl amine; a tertiary amine such as triethyl amine and triethanol amine; a hydroxide of alkali metal such as sodium hydroxide and potassium hydroxide. Further, in the cases of the aqueous polyether polyol having a polyethylene oxide chain, the polyvinyl alcohol, or the cellulose derivative, the aqueous liquid thereof is prepared just by mixing and agitating them with water. If necessary, the solubilization may be conducted at the elevated temperature.

The aqueous polyol liquid preferably has the concentration of 20 mass % or more, more preferably 25 mass % or more, while preferably has the concentration of 65 mass % or less, more preferably 60 mass % or less. If the concentration is less than 20 mass %, the curing reaction between the aqueous polyol and the polyisocyanate of the curing agent tends to be slow. If the concentration is more than 65 mass %, the viscosity will be higher, resulting in the lower painting-workability.

In the present invention, as the curing agent for the aqueous polyol of the two-component curing type aqueous urethane paint, preferably used is the aqueous polyisocyanate. The use of the aqueous polyisocyanate allows a homogenous curing reaction between the aqueous polyol and the aqueous polyisocyanate.

The aqueous polyisocyanate is not limited, as long as the polyisocyanate is modified to be aqueous (water soluble or water dispersible). Examples of the aqueous polyisocyanate include an aqueous polyisocyanate modified with polyoxyalkylene ether alcohol.

The polyisocyanate component constituting the aqueous polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI) and paraphenylene diisocyanate (PPDI); and an alicyclic or aliphatic polyisocyanate such as 4,4'-dicyclohexylmethane diisocyanate (hydrogenated MDI), hydrogenated xylylenediisocyanate ($H_6$XDI) hexamethylene diisocyanate (HDI), and isophorone diisocyanate (IPDI). The polyisocyanate can be used either alone or in combination of two or more. Among them, non-yellowing type polyisocyanate (TMXDI, XDI, HDI, $H_6$XDI, IPDI, $H_{12}$MDI) are preferable in view of weather resistance, and the aqueous hexamethylene diisocyanate is more preferable. Specific examples of the aqueous polyisocyanate are CR-60N available from DAINIPPON INK AND CHEMICALS, INC., Coronate C3062, C3053 available from NIPPON POLYURETHANE INDUSTRY, and Bayhdur 3100 available from SUMITOMO BAYER URETHANE, and I-3 available from SHINTO PAINT.

The mixing ratio (NCO/OH) of the aqueous polyisocyanate to the aqueous polyol is not limited. NCO/OH (molar ratio) is preferably not less than 1.2, more preferably not less than 1.3, even more preferably not less than 1.5, while the NCO/OH (molar ratio) is preferably not more than 2.0, more preferably not more than 1.8. If NCO/OH (molar ratio) is less than 1.2, the curing reaction tends to be insufficient. The insufficient curing reaction causes the tackiness of the resulting paint film, thus the dust and the dirt tend to adhere to the resultant paint film. While if the molar ratio of NCO/OH is greater than 2.0, the residual isocyanate group tends to react with moisture, thereby generating $CO_2$. As a result, the air bubble tends to be contained in the paint film.

The two-component curing type urethane paint may further include an organic solvent in addition to the above aqueous polyol and the aqueous polyisocyanate, since the organic solvent improves the mutual dispersibility between the aqueous polyol and the aqueous polyisocyanate, thereby promoting the curing reaction. The organic solvent includes, for example, acetone, methyl ethyl ketone, ethyl acetate, N,N-dimethylformamide, N-metylpyrrolidone, and methoxybutyl acetate. As the above organic solvent, it is preferable to use so called "film forming additive". The film forming additive can enhance the film forming ability of the paint film, thereby improving the properties of the resultant paint film. Further, since the film forming additive is less volatile, it is possible to reduce the amount of the volatile organic solvent.

Examples of the film forming additive are a glycolic ether type solvent such as ethyleneglycol monomethylether, ethyleneglycol monoethylether, ethyleneglycol monobutylether, ethyleneglycol monohexylether, ethyleneglycol 2-ethylhexylether, propyleneglycol butylether, dipropyleneglycol butylether, diethyleneglycol monoethylether, and diethyleneglycol monobutylether; a glycolic ester type solvent such as ethyleneglycol monomethylether acetate, ethyleneglycol monoethylether acetate, propyleneglycol monomethylether acetate, diethyleneglycol monoethylether acetate, and diethyleneglycol monobutylether acetate. The above organic solvent and the film forming additive can be used either alone or in combination of at least two of them.

The amount of the organic solvent contained in the two-component curing type aqueous paint is preferably 5 mass % or more, more preferably 12 mass % or more, even more preferably 14 mass % or more, and is preferably 20 mass % or less, more preferably 18 mass % or less, even more preferably 16 mass % or less. Because the use in an amount of more than 20 mass % does not meet the object to reduce the volatile component as well as raises the raw material cost of the paint. While if the amount is less than 5 mass %, the film forming ability and the mutual dispersibility between the aqueous polyol and the aqueous polyisocyanate tend to be lowered.

The organic solvent or the film forming additive may be contained into either of a base resin including an aqueous polyol and the like, and the curing agent including the aqueous polyisocyanate.

The two-component curing type urethane paint preferably used in the present invention may further include an additive such as a pigment, an UV absorber, an antioxidant, a light-stabilizer, a fluorescent brightener, an anti-blocking agent, a leveling agent, and a slipping agent, which are conventionally used for the golf ball paint, in addition to the above base resin component.

The method for producing the golf ball of the present invention comprises forming the mark on the surface of the golf ball body, and forming the paint film covering the mark and the golf ball body. The resin component forming the mark (hereinafter, maybe referred to as "mark base resin"), is not limited, as long as it can react with the curing agent contained in the aqueous paint. Examples of the mark base resin are an epoxy resin, a urethane resin, a polyester resin, and a polyamide resin. The above ink composition forming the mark may include so called "a two-component curing type ink" containing a base resin component and a curing agent, as long as the effect of the present invention is not deteriorated.

In the case that the two-component curing type aqueous urethane paint containing the aqueous polyol and the aqueous polyisocyanate is used as the aqueous paint forming the paint film, the mark base resin may conduct a curing reaction with the aqueous polyisocyanate. The mark base resin includes, for example, a resin having a functional group with an active hydrogen such as hydroxyl group, amino group, imino group, thiol group, and carboxyl group. In this embodiment, the molar ratio of isocyanate group of the aqueous polyisocyanate contained in the aqueous paint to total functional group having the active hydrogen (hydroxyl group of the aqueous polyol+functional group having the active hydrogen of the base resin forming the mark), namely NCO/total functional group having the active hydrogen (molar ratio) is preferably at least 1.0, more preferably at least 1.1, and is preferably not more than 2.0, more preferably not more than 1.9. It is possible to cure both the paint film and the mark sufficiently by making the ratio of NCO/total functional group having the active hydrogen in the above range.

Among the resin having the active hydrogen, preferred is an epoxy resin having a hydroxyl group. The use of the above epoxy resin as the base resin forming the mark, imparts the durability to the mark. In addition, the hydroxyl group conducts a curing reaction with the aqueous polyisocyanate, thereby enhancing the durability more. As a result, the crack does not occur even against the shot in the obtained mark.

The epoxy resin having the hydroxyl group is not limited, as long as the epoxy resin has the hydroxyl group and the epoxy group in the molecular chain. The epoxy resin having the hydroxyl group includes, for example, a bisphenol type epoxy resin such as a bisphenol A type epoxy resin obtainable by reacting bisphenol A with epichlorohydrin, a bisphenol F type epoxy resin obtainable by reacting bisphenol F with epichlorohydrin, and a bisphenol AD type epoxy resin obtainable by reacting bisphenol AD with epichlorohydrin. Examples of other resins having the hydroxyl group are a polyester polyol, a polycarbonate polyol and an acrylic polyol that are obtainable by incorporating the hydroxyl groups at the terminal or at the backbone of the polymer such as the polyester resin, the polycarbonate resin, and the acrylic copolymer, respectively. In addition, a partially nitrated nitrocellulose resin, namely, less than 3 hydroxyl groups of 3 hydroxyl groups of the glucose which is a constituting unit of the cellulose are substituted in average, is also preferable. The resin having the hydroxyl group mentioned above can be cured by reacting the hydroxyl group thereof with the aqueous polyisocyanate as the curing agent of the aqueous paint.

The ink composition used in the present invention may further comprise a solvent, a flatting agent, in addition to the above components, as required. Examples of the solvent are an aromatic hydrocarbon (toluene, xylene, etc.), an ester type solvent (ethyl acetate, butyl acetate, etc.), a ketone type solvent (methyl ethyl ketone, etc.), an ether type solvent (dimethylether, diethylether, etc.), an alcohol type solvent (methanol, ethanol, isopropanol, etc). The ratio of the solvent contained in the ink composition is preferably at least 30 mass %, more preferably at least 35 mass %, and is preferably not more than 70 mass %, more preferably not more than 65 mass %. If the ratio of the solvent is less than 30 mass %, it is getting difficult to transfer the ink from a printing pad to the surface of the golf ball. Thus, pin holes are likely to occur on the printed mark, resulting in the deterioration in the appearance of the mark. While if the ratio of the solvent is more than 70 mass %, it takes a longer time to dry the mark after printed, and the productivity of the golf ball is lowered. In addition, the mark can become blurred, and the unprinted portion or pin holes tend to occur, because the amount of the resin component and the pigment contained in the ink become relatively low.

The flatting agent includes, for example, colloidal silica, low density polyethylene, or medium density polyethylene. The ratio of the flatting agent contained in the ink is preferably, but not limited to, from 1 mass % to 30 mass %.

As the method for printing the mark on the surface of the golf ball body, the conventional method can be employed. For example, the mark printing method includes a thermal transfer method comprising the steps of: providing a transfer sheet printed with a mark pattern formed of the aforementioned ink composition; and applying the transfer sheet onto the cover, followed by heating, and a pad printing method comprising the steps of: filling an engraved mark pattern of an intaglio with the aforementioned ink composition; applying a pad to the intaglio to allow the ink forming the mark pattern to adhere to the pad; and applying the pad onto the cover so that the ink forming the mark pattern is transferred to the cover surface. Preferably employed is the pad printing method. Generally, the mark pattern is dried at 30 to 50° C. for 1 to 12 hours.

The mark is printed directly on the cover surface, thereby enhancing the productivity. In addition, the paint film is preferably formed prior to drying the mark completely, because the curing agent of the paint can easily penetrate into the mark.

According to the present invention, the paint film is preferably formed by applying and drying the above two-component curing type aqueous paint on the surface of the golf ball body. The method of applying the above paint is not limited, and includes the conventional method for the two-component curing type paint. For example, the base resin containing the aqueous polyol liquid and the curing agent containing the aqueous polyisocyanate are mixed, then the electrostatic coating method, or spray method using an air spray gun can be employed for the application of the golf ball. Further, the surface of the golf ball may be subjected to the surface treatment such as cleaning or sandblast prior to the coating. In the case of applying the paint with the spray gun, the base resin containing the aqueous polyol liquid and the curing agent containing the aqueous polyisocyanate may be mixed bit by bit, or the base resin containing the aqueous polyol liquid and the curing agent containing the aqueous polyisocyanate are fed with the respective pumps and continuously mixed in a constant ratio through the static mixer located in the stream line just before the spray gun. Alternatively, the base resin containing the aqueous polyol liquid and the curing agent containing the aqueous polyisocyanate can be air-sprayed respectively with the spray gun having the device for controlling the mixing ratio thereof. Subsequently, the two-component curing type aqueous urethane paint coated on the surface of the golf ball body is dried and cured, for example, at the temperature of less than 50° C. for 0.5 to 2 hours to obtain the paint film.

The paint film after dried, without limitation, preferably has a thickness of 5 μm to 25 μm. If the thickness is less than 5 μm, the paint film will be easily worn out by the continuous use. While if the thickness is more than 25 μm, the dimple will not work efficiently, thus the flying performance of the resultant golf ball tends to be low. In addition, the paint film may have a single layer structure or a multi layer structure having at least two layers, as long as the thickness of the paint film falls within the above range. The paint film preferably has the single layer structure, because the painting process can be simplified and the paint film in the present invention shows the excellent paint properties even in the single layer structure. The paint film can be the outermost clear paint layer. The golf ball of the present invention has no limitation on its structure and includes a one-piece golf ball, a two-piece golf ball, a multi-piece golf ball comprising at least three layers, and a wound-core golf ball. The present invention can be applied to all types of the golf ball. In the following, the method for preparing the golf ball of the present invention will be explained based on the embodiment of the two-piece golf ball, but the present invention is not limited to the two-piece golf ball and the process explained below.

The present invention can employ any core which is well-known as the core for the two-piece golf ball. The core of the two-piece golf ball, for example, without limitation, is preferably a molded body which is formed by vulcanizing a rubber composition. The rubber composition preferably comprises a base rubber, a co-crosslinking agent, and a crosslinking initiator.

Examples of the base rubber are butadiene rubber (BR), ethylene-propylene-diene terpolymer (EPDM), isoprene rubber (IR), styrene-butadiene rubber (SBR), and acrylonitrile-butadiene rubber (NBR). Among them, butadiene rubber, particularly cis-1,4-polybutadiene, is preferable in view of its superior repulsion property. Typically preferred is the high cis-polybutadiene rubber having cis-1,4 bond in a proportion of not less than 40%, more preferably not less than 70%, even more preferably not less than 90%.

The co-crosslinking agent used in the present invention includes, for example, an $\alpha,\beta$-unsaturated carboxylic acid or a metal salt thereof. Typically preferred is the $\alpha,\beta$-unsaturated carboxylic acid having 3 to 8 carbon atoms such as acrylic acid and methacrylic acid or the metal salt thereof. As the metal forming the metal salt of the $\alpha, \beta$-unsaturated carboxylic acid, a monovalent or divalent metal such as zinc, magnesium, calcium, aluminum and sodium is preferably used. Among them, zinc is preferable, because it can impart the higher repulsion property to the golf ball. The amount of the co-crosslinking agent to be blended in the rubber composition is preferably not less than 20 parts by mass, more preferably not less than 25 parts by mass, and preferably not more than 50 parts by mass, more preferably not more than 40 parts by mass based on 100 parts by mass of the base rubber.

As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the organic peroxide to be blended in the rubber composition is preferably not less than 0.2 part by mass, more preferably not less than 0.3 part by mass, and preferably not more than 1.5 parts by mass, more preferably not more than 1.0 part by mass based on 100 parts by mass of the base rubber.

The rubber composition for the core may further contain a specific gravity adjusting agent such as zinc oxide and barium sulfate, an antioxidant, a color powder, and the like, as required.

The core is formed by press-molding the above rubber composition into the spherical body at the heating conditions. The conditions for the press-molding should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The core thus obtained is covered with the cover composition to form a golf ball body. The cover composition, for example, includes a thermoplastic resin such as an ionomer resin, and an urethane resin; a two-component curing type urethane resin; a balata and a hard rubber. Preferably used is the thermoplastic urethane resin, or the two-component curing type urethane resin, since the adhesion of the cover to the two-component curing type aqueous urethane resin constituting the paint film will be enhanced. Further, when forming the cover to obtain a golf ball body, the cover can be formed with a multiplicity of concavities, which are so called "dimple", at the surface thereof. As required, the surface of the golf ball can be subjected to grinding treatment such as sandblast in order to improve the adhesion of the mark and the paint film.

Although the method for preparing the golf ball is explained based on the embodiment of the two-piece golf ball, the wound core can be used for preparing a wound golf ball, and at least one intermediate layer can be formed between the core and the cover for preparing the multi-piece golf ball including at least three layers.

For preparing a wound golf ball, a conventional wound core can be used in the present invention. The wound core comprises a center and a rubber thread layer which is formed by winding a rubber thread around the center in an elongated state. Examples of the center are a liquid center and a solid center formed of rubber. In the present invention, the rubber thread, which is conventionally used for winding around the center, can be adopted for winding around the center. The rubber thread, for example, is obtained by vulcanizing a rubber composition including a natural rubber, or a mixture of natural rubber and a synthetic polyisoprene, a sulfur, a vulcanization auxiliary agent, a vulcanization accelerator, and an antioxidant. The rubber thread is wound around the center in elongation of about 10 times length to form the wound core.

When preparing a multi-piece golf ball comprising at least three layers, the intermediate layer includes, for example, a thermoplastic resin such as a polyurethane resin, an ionomer resin, Nylon, and a polyethylene; a thermoplastic elastomer such as a polystyrene elastomer, a polyolefin elastomer, a polyurethane elastomer, a polyester elastomer, and a polyamide elastomer.

Examples of the ionomer resin are one prepared by neutralizing at least a part of carboxyl groups in a copolymer composed of ethylene and $\alpha,\beta$-unsaturated carboxylic acid with a metal ion, and one prepared by neutralizing at least a part of carboxyl groups in a terpolymer composed of ethylene, $\alpha,\beta$-unsaturated carboxylic acid and $\alpha,\beta$-unsaturated carboxylic acid ester with a metal ion.

Examples of the $\alpha,\beta$-unsaturated carboxylic acid are acrylic acid, and methacrylic acid. Examples of the $\alpha,\beta$-unsaturated carboxylic acid ester are methyl ester, ethyl ester, propyl ester, n-butyl ester, isobutyl ester and the like of acrylic acid, methacrylic acid. The metal for neutralizing the carboxyl group includes alkali metal such as sodium, potassium, and lithium; or alkali earth metal such as magnesium, calcium; or divalent transition metal such as zinc, and copper. Further, the above ionomer resin can be used as the mixture thereof in order to obtain the desired resilience and hardness.

The intermediate layer may further include a gravity adjusting agent such as barium sulfate and tungsten, an antioxidant, a pigment and the like.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Method]
(1) Impact-Resistance of the Paint Film (Adhesion of the Paint Film Against the Impact)

Each painted golf ball was hit 150 times repeatedly with a five iron attached to a swing robot manufactured by TRU-ETEMPER CO, at the head speed of 34 m/sec. The peeling condition of the paint film was visually observed, and evaluated according to the following criteria.

E(Excellent): None of the paint film peeled off.
G(Good): The area where the paint film peeled off was not more than 5% with respect to the whole area of the paint film.

F(Fair): The area where the paint film peeled off was from 5% (exclusive) to 20% with respect to the whole area of the paint film.
P(Poor): The area where the paint film peeled off was more than 20% with respect to the whole area of the paint film.

(2) Wear-Resistance of the Paint Film (Adhesion of the Paint Film Against Frictions)

Each painted golf ball was subjected to brushing wash for 1 hour in the potato peeler having the inside surface covered with the brush. The peeling condition of the paint film was visually observed, and evaluated according to the following criteria.
E(Excellent): None of the paint film peeled off.
G(Good): The area where the paint film peeled off was not more than 5% with respect to the whole area of the paint film.
F(Fair): The area where the paint film peeled off was from 5% (exclusive) to 20% with respect to the whole area of the paint film.
P(Poor): The area where the paint film peeled off was more than 20% with respect to the whole area of the paint film.

(3) Adhesion of the Mark

Each painted golf ball was hit 150 times repeatedly with a five iron attached to a swing robot manufactured by TRU-ETEMPER CO, at the head speed of 34 m/sec. The peeling condition of the mark was visually observed, and evaluated according to the following criteria.
E(Excellent): None of the mark peeled off.
G(Good): The area where the mark peeled off was not more than 1 mm$^2$.
F(Fair): The area where the mark peeled off was from 1 mm$^2$ (exclusive) to 4 mm$^2$ (acceptable range).
P(Poor): The area where the mark peeled off was more than 4 mm$^2$.

(4) Productivity of the Golf Ball

The golf balls were produced using the ink for printing a mark in a predetermined amount, and the mark was evaluated as to whether or not the unprinted portion or pin holes were found on the mark.

[Production of the Two-Piece Golf Ball]

(1) Preparation of Solid Core

The rubber composition shown in Table 1 was kneaded and pressed with upper and lower molds each having a spherical cavity at the heating condition of 160° C. for 13 minutes to obtain the solid core in a spherical shape having a diameter of 39.3 mm.

TABLE 1

| Core formulation | Amount (parts) |
| --- | --- |
| Polybutadiene rubber | 100 |
| Zinc oxide | 5.6 |
| Zinc acrylate | 22.0 |
| Calcium carbonate | 21.0 |
| Dicumyl peroxide | 1.85 |

Notes on Table 1:
Polybutadiene rubber: BR-11 (cis content: 96%) available from JSR.
Zinc acrylate: "ZNDA-90S" produced by NIHON JYORYU KOGYO.
Zinc oxide: "Ginrei R" produced by Toho-Zinc.
Calcium carbonate: "BF300" produced by BIHOKU FUNKA KOGYO
Dicumyl peroxide: "Percumyl D" produced by NOF Corporation.

(2) Preparation of the Cover Material

The materials shown in Table 2 were mixed using a twin-screw kneading extruder to obtain the cover composition in the form of pellet. The extrusion was conducted in the following conditions:
screw diameter=45 mm,
screw revolutions=200 rpm,
screw L/D=35, and the cover composition was heated to from 200° C. to 260° C. at the die position of the extruder.

TABLE 2

| Cover material | Amount (parts) |
| --- | --- |
| Himilan 1605 | 40 |
| Himilan 1706 | 30 |
| Himilan 1707 | 30 |
| Titanium oxide | 2 |

Notes on Table 2:
HIMILAN 1605: an ionomer resin of a sodium ion-neutralized ethylene-methacrylic acid copolymer, available from MITSUI-DUPONT POLYCHEMICAL.
HIMILAN 1706: an ionomer resin of a zinc ion-neutralized ethylene-methacrylic acid copolymer, available from MITSUI-DUPONT POLYCHEMICAL.
HIMILAN 1707: an ionomer resin of a sodium ion-neutralized ethylene-methacrylic acid copolymer, available from MITSUI-DUPONT POLYCHEMICAL.

(3) Preparation of the Golf Ball Body

The cover composition thus prepared was directly injection-molded onto the core to form the cover, thereby obtaining the two-piece golf ball body having a diameter of 42.7 mm. The upper and lower molds for forming the cover have a spherical cavity with dimples. The part of the dimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball body was discharged.

(4) Printing a Mark and Forming a Paint Film

The surface of the obtained golf ball body was subjected to the sandblast treatment, the mark "X" of width 8 mm, height 8 mm, line width 2 mm was printed by the pad stamp using the ink compositions A and B shown in Table 3. Then, the two-component curing type aqueous urethane paint was coated thereto with the air-gun. The paint was dried in the oven heated at 40° C. to form the paint film having the thickness of 10 μm. The impact-resistance and the wear-resistance of the obtained paint film and the durability of the mark were evaluated in terms of each golf ball. The results were also shown in Table 4.

TABLE 3

| Ink composition | Ink composition A | Ink composition B |
| --- | --- | --- |
| Epoxy resin having a terminal hydroxyl group | 25 | 25 |
| Pigment(phtahlocyanine blue) | 10 | 10 |
| Flatting agent | 15 | 15 |
| Solvent(ethyleneglycol monomethyl ether) | 50 | 50 |
| Curing agent(hexamethylene diisocyanate) | — | 8 |

Unit: Parts
Notes on Table 3;
Ink composition B: NCO(HDI)/OH(epoxy resin) = 1.5

TABLE 4

|  | Golf ball No. | | | | | | |
|---|---|---|---|---|---|---|---|
|  | No. 1 | No. 2 | No. 3 | No. 4 | No. 5 | No. 6 | No. 7 |
| Base resin (parts) | — | — | — | — | — | — | — |
| Aqueous polyol 1 | 55.6 | 55.6 | 55.6 | 55.6 | 55.6 | 55.6 | 55.6 |
| Aqueous polyol 2 | 44.4 | 44.4 | 44.4 | 44.4 | 44.4 | 44.4 | 44.4 |
| Polyester polyol/Acrylic polyol*1) | 8/1 | 8/1 | 8/1 | 8/1 | 8/1 | 8/1 | 8/1 |
| Viscosity modifier | 0.2 | 0.2 | 0.2 | 0.2 | 0.2 | 0.2 | 0.2 |
| Water | 215 | 215 | 215 | 215 | 215 | 215 | 215 |
| Curing agent (parts) | — | — | — | — | — | — | — |
| aqueous hexamethylene diisocyanate | 75 | 66 | 58 | 50 | 58 | 58 | 100 |
| Solvent (parts) | — | — | — | — | — | — | — |
| 3-methoxybutyl acetate | 25 | 34 | 42 | 50 | — | — | — |
| methyl ethyl keton | — | — | — | — | 42 | — | — |
| Propyleneglycolmonomethylether acetate | — | — | — | — | — | 42 | — |
| Amount of the solvent of the paint (mass %) | 8 | 12 | 14 | 16 | 14 | 14 | 0 |
| Base resin/Curing agent (NCO/OH molar ratio) | 1.5 | 1.5 | 1.5 | 1.5 | 1.5 | 1.5 | 1.5 |
| Evaluation | — | — | — | — | — | — | — |
| Impact resistance of the paint film | E | E | E | E | E | E | E |
| Wear-resistance of the paint film | E | E | E | E | E | E | E |
| Durability of the mark | F | G | E | E | E | E | E |
| Productivity (pin hole of the mark) | Good | Good | Good | Good | Good | Good | Poor |

*1)mass ratio of polyester polyol/acrylic polyol

Notes on Table 4;

Aqueous polyol 1: an aqueous polyester polyol having OH value of 33 mgKOH/g, available from SHINTO PAINT.

Aqueous polyol 2: a mixture of an aqueous polyester polyol/an aqueous acrylic polyol (aqueous polyester polyol/acrylic polyol = 4/1, mass ratio) having OH value of 66 mgKOH/g, available from SHINTO PAINT.

Curing agent: aqueous hexamethylene diisocyanate available from SHITO PAINT.

Viscosity modifier: RHEOLATE288 available from ELEMENTIS JAPAN.

In Table 4, golf balls Nos. 1 to 6 are the cases that the two-component curing type aqueous urethane paint containing the aqueous polyol as the base resin and the aqueous hexamethylene diisocyanate as the curing agent and a solvent was used as an aqueous paint forming the paint film, and that the epoxy resin (ink composition A) having the hydroxyl group was used as the resin component forming the mark. The obtained golf balls Nos. 1 to 6 were excellent in the adhesion of the paint film and the durability of the mark. Especially, higher ratio of the solvent contained in the two-component curing type aqueous paint improved the durability of the mark. In the case that the ratio of the solvent was 14 mass % or more, the durability of the mark was extremely high. In addition, it was possible to produce each golf ball continuously using the predetermined amount of the ink without the occurrence of the unprinted portion or pin holes.

On the other hand, golf ball No. 7 is the case that the conventional ink for printing marks, which contains the epoxy resin having the hydroxyl group as the resin component and polyisocyanate as the curing agent, was used to produce the golf ball continuously. In 4 hours after the beginning of printing of the mark, the unprinted portion was found on the mark.

According to the present invention, it is possible to prevent the productivity from being lowered due to the exchange of the ink, and to prevent the occurrence of the unprinted portion in the mark, while printing the mark on the golf ball body. In addition, the obtained golf ball of the present invention is excellent in the durability of the mark and the adhesion of the paint film.

This application is based on Japanese Patent application No. 2,004-182,842 filed on Jun. 21, 2004, the contents of which are hereby incorporated by reference.

What is claimed is:

1. A method for producing a golf ball, comprising:
    forming a mark on a surface of a golf ball body with an ink composition containing a resin component,
    forming a paint film to cover the mark and the golf ball body using an aqueous paint prior to drying the mark,
    wherein the aqueous paint is a two-component curing type aqueous paint comprising a base resin, a curing agent, and a solvent, the solvent being a film forming additive and the amount of the solvent contained in the two-component curing type aqueous paint being 12 mass % to 20 mass %, and
    curing the resin component in the ink composition with the curing agent contained in the aqueous paint.

2. The method according to claim 1, wherein the two-component curing type aqueous paint comprises an aqueous polyol as the base resin and an aqueous polyisocyanate as the curing agent.

3. The method according to claim 2, wherein the aqueous polyisocyanate is aqueous hexamethylene diisocyanate.

4. The method according to claim 2, wherein the aqueous polyol is at least one selected from the group consisting of an aqueous urethane polyol, an aqueous acrylic polyol, an aqueous polyester polyol, and an aqueous alkyd resin.

5. The method according to claim 2, wherein the aqueous polyol is an aqueous polyester polyol.

6. The method according to claim 2, wherein the aqueous polyol is a mixture of an aqueous polyester polyol and an aqueous acrylic polyol.

7. The method according to claim 6, wherein a mass ratio of the aqueous polyester polyol to the aqueous acrylic polyol ranges from 4:1 to 10:1.

8. The method according to claim 2, wherein the two-component curing type aqueous paint comprises the aqueous polyol and the aqueous polyisocyanate in such a molar ratio that isocyanate group of the aqueous polyisocyanate is excess to the hydroxyl group of the aqueous polyol.

9. The method according to claim 8, wherein the molar ratio of the isocyanate group of the aqueous polyisocyanate to the hydroxyl group of the aqueous polyol NCO/OH is ranging from 1.2 to 2.0.

10. The method according to claim 2, wherein an epoxy resin having a hydroxyl group is used as a resin component forming the mark.

11. A method for producing a golf ball, comprising:
forming a mark on a surface of a golf ball body with an ink composition containing an epoxy resin having a hydroxyl group as a resin component,
forming a paint film to cover the mark and the golf ball body using an aqueous paint, wherein the aqueous paint is a two-component curing type aqueous urethane paint comprising an aqueous polyol as a base resin, an aqueous polyisocyanate as a curing agent, and a solvent, the solvent being a film forming additive and the amount of the solvent contained in the two- component curing type aqueous paint being 12 mass % to 20 mass %, and
curing the resin component in the ink composition with the curing agent contained in the aqueous paint.

12. The method according to claim 11, wherein the molar ratio of the isocyanate group of the aqueous polyisocyanate to the hydroxyl group of the aqueous polyol NCO/OH ranges from 1.2 to 2.0.

13. The method according to claim 12, wherein the aqueous polyisocyanate is aqueous hexamethylene diisocyanate.

14. The method according to claim 13, wherein the aqueous polyol is a mixture of an aqueous polyester polyol and an aqueous acrylic polyol and a mass ratio of the aqueous polyester polyol to the aqueous acrylic polyol ranges from 4:1 to 10:1.

15. The method according to claim 1, wherein the film forming additive is at least one selected from the group consisting of a glycolic ether type solvent and a glycolic ester type solvent.

16. The method according to claim 15, wherein
the glycolic ether type solvent is at least one selected from the group consisting of ethyleneglycol monomethylether, ethyleneglycol monoethylether, ethyleneglycol monobutylether, ethyleneglycol monohexylether, ethyleneglycol 2-ethylhexylether, propyleneglycol butylether, dipropyleneglycol butylether, diethyleneglycol monoethylether, and diethyleneglycol monobutylether.

17. The method according to claim 16, wherein the glycolic ester type solvent is at least one selected from the group consisting of ethyleneglycol monomethylether acetate, ethyleneglycol monoethylether acetate, propyleneglycol monomethylether acetate, diethyleneglycol monoethylether acetate, and diethyleneglycol monobutylether acetate.

18. The method according to claim 11, wherein the film forming additive is at least one selected from the group consisting of a glycolic ether type solvent and a glycolic ester type solvent.

19. The method according to claim 18, wherein
the glycolic ether type solvent is at least one selected from the group consisting of ethyleneglycol monomethylether, ethyleneglycol monoethylether, ethyleneglycol monobutylether, ethyleneglycol monohexylether, ethyleneglycol 2-ethylhexylether, propyleneglycol butylether, dipropyleneglycol butylether, diethyleneglycol monoethylether, and diethyleneglycol monobutylether.

20. The method according to claim 19, wherein the glycolic ester type solvent is at least one selected from the group consisting of ethyleneglycol monomethylether acetate, ethyleneglycol monoethylether acetate, propyleneglycol monomethylether acetate, diethyleneglycol monoethylether acetate, and diethyleneglycol monobutylether acetate.

21. The method according to claim 10, wherein the molar ratio of isocyanate groups of the aqueous polyisocyanate contained in the aqueous paint to total functional groups having an activated hydrogen, including hydroxyl groups of the aqueous polyol and hydroxyl groups of the epoxy resin, is 1.0 to 2.0.

22. The method according to claim 11, wherein the molar ratio of isocyanate groups of the aqueous polyisocyanate contained in the aqueous paint to total functional groups having an activated hydrogen, including hydroxyl groups of the aqueous polyol and hydroxyl groups of the Epoxy resin, is 1.0 to 2.0.

* * * * *